United States Patent [19]

Katayama et al.

[11] 3,963,653

[45] June 15, 1976

[54] PROCESS FOR PRODUCING HYDROCARBON RESIN AND PRESSURE-SENSITIVE ADHESIVES CONTAINING SAME

[75] Inventors: Shigeru Katayama; Izuru Yokoyama; Katsuhiko Tasaka, all of Iwakuni, Japan

[73] Assignee: Mitsui Petrochemical Industries, Ltd., Tokyo, Japan

[22] Filed: June 17, 1975

[21] Appl. No.: 587,563

Related U.S. Application Data

[62] Division of Ser. No. 452,577, March 19, 1974.

[30] Foreign Application Priority Data

Mar. 19, 1973 Japan............................ 48-30853

[52] U.S. Cl. .............................. 260/4 AR; 260/5; 260/887; 260/889; 260/892; 260/890; 260/875; 260/894; 260/897 A; 260/896
[51] Int. Cl.² ..................... C08L 7/00; C08L 53/02; C08L 47/00; C08L 9/00
[58] Field of Search.............. 260/82, 4 AR, 5, 896, 260/888, 889, 890, 892, 894, 874, 897

[56] References Cited

UNITED STATES PATENTS

| | | | |
|---|---|---|---|
| 3,860,543 | 1/1975 | Masuda et al. | 260/82 |
| 3,875,095 | 4/1975 | Yamada et al. | 260/82 |

*Primary Examiner*—Joseph L. Schofer
*Assistant Examiner*—Maria S. Tung
*Attorney, Agent, or Firm*—Sughrue, Rothwell, Mion, Zinn & Macpeak

[57] ABSTRACT

A process for producing a hydrocarbon resin (C) which comprises copolymerizing 100 parts by weight of vinyl aromatic hydrocarbons (A) containing more than 80% by weight isopropenyltoluene and from about 5 to 100 parts by weight of a fraction (B) which is the by-product of cracking or refining petroleum and mainly comprising unsaturated hydrocarbons having a boiling point ranging from about −15°C to 45°C and having 4 to 5 carbon atoms in the presence of a Friedel-Crafts catalyst and pressure-sensitive adhesives comprising the hydrocarbon resin produced in combination with a rubber.

6 Claims, No Drawings

PROCESS FOR PRODUCING HYDROCARBON RESIN AND PRESSURE-SENSITIVE ADHESIVES CONTAINING SAME

This is a Division of application Ser. No. 452,577, filed Mar. 19, 1974.

BACKGROUND OF THE INVENTION

1. FIELD OF THE INVENTION

The present invention relates to a process of producing a novel hydrocarbon resin suitable as a tackifier for pressure-sensitive adhesives. The invention also relates to a pressure-sensitive adhesive containing the novel hydrocarbon resin produced by the process as a tackifier.

2. DESCRIPTION OF THE PRIOR ART

Pressure-sensitive adhesives are used for pressure-sensitive adhesive tapes or labels by coating the adhesives on base materials such as papers, cloths, and plastic films. Such pressure-sensitive adhesives must satisfy the following three criteria:

1. They must be tacky at normal temperature and have a high degree of tackiness.
2. They must have high adhesive strength.
3. They must have high breaking resistance, that is, high cohesion.

If adhesives are lacking in any one of the aforesaid three fundamental properties, they are not superior as adhesives. In general, as a base for pressure-sensitive adhesives, natural rubber or various synthetic rubbers are used but since such a rubber itself is insufficient in these fundamental properties, the insufficiency is supplemented by the addition of a tackifier. The tackifier also must have not only improved rubber-like properties but also excellent compatibility with rubber, high solubility in solvents, good color, high chemical stability, and excellent weatherability. A terpene resin has hitherto been used as the most excellent tackifier and other resins similar to a terpene resin, such as rosin, a derivative of rosin, a cumaroneindene resin, an aromatic petroleum resin, and an aliphatic petroleum resin have also been used for this purpose although they are inferior in properties to a terpene resin. However, since a terpene resin is prepared by polymerizing the α-pinene, β-pinene, dipentene, etc., present in the volatile oils recovered from pine trees or oak trees, that is, is prepared using natural materials as a raw material, the supply of the resin is not stable and the cost of such a resin is not low.

Also, it may be possible to provide similar properties to the terpene resin to an aromatic petroleum resin by hydrogenating a part or all of the resin to an alicyclic structure but for this purpose the hydrogenation must be conducted under extreme conditions such as high temperature and high pressure and hence on considering these problems in the complicated nature of the steps and in the cost of the equipment, it has been difficult to obtain such a resin in a low cost.

SUMMARY OF THE INVENTION

Therefore, conventionally, it has been generally considered to be impossible to obtain a tackifier having various excellent properties from petroleum resins, in particular from aromatic petroleum resins without modifying such resins. However, it has astonishingly been discovered that a resin containing isopropenyltoluene as a component thereof has the same properties as or superior properties to the properties of a terpene resin as a tackifier and based on such a discovery the inventors have succeeded in attaining the present invention.

DETAILED DESCRIPTION OF THE INVENTION

Isopropenyltoluene is a known material and can be prepared in accordance with the following procedures.

1. Dehydrogenation of Cymene:
Cymene

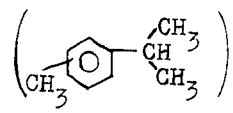

is dehydrated in the presence of a catalyst such as an oxide of iron, copper, chromium, etc. The method and the conditions employed are disclosed in Japanese Patent Publication No. 2373/'57.

2. By-product in Cresol Production:
Isopropenyltoluene can be obtained as a by-product in the process for producing cresol from cymene as disclosed in U.S. Pat. No. 2,628,983.

3. Dehydration of Tolyldimethylcarbinol
Further, isopropenyltoluene may be obtained from the dehydration of tolyldimethylcarbinol

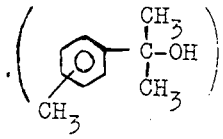

As isopropenyltoluene, the ortho isomer, the meta isomer, and the para isomer thereof can be used individually or as a mixture of the isomers and in particular it is preferable to use a mixture of about 20 to 60% by weight of the para isomer, about 40 to 80% by weight of the meta isomer, and about 0 to 10% by weight of the ortho isomer. The isopropenyltoluene can, of course, be pure but can also contain less than 20% by weight of other polymerizable monomer or monomers such as styrene, vinyltoluene, and α-methylstyrene. It should be noted that a resin having desirable properties as a tackifier is not obtained if other similar compounds such as, for example, styrene, vinyltoluene, and α-methylstyrene, are used in place of isopropenyltoluene.

The fractions containing unsaturated hydrocarbons having 4 to 5 carbon atoms (hereinafter, for brevity such fractions are designated "$C_4$-$C_5$ fractions" in this specification), which are by-products in the refining and cracking of petroleum, are fractions having a boiling point ranging from about −15°C to +45°C and contain such polymerizable monomers as 1-butene, isobutylene, 2-butene, 1,3-butadiene, 1-pentene, 2-methyl-1-butene, 3-methyl-1-butene, 2-pentene, iosprene, 1,3-pentadiene, cyclopentadiene, etc. The composition of the $C_4$-$C_5$ fraction generally is as follows:

| Component | % by weight |
|---|---|
| $C_3$-Hydrocarbons | 0 to 3 |
| Butene (1-Butene, cis and trans 2-Butene, Isobutene) | 20 to 50 |
| Butadiene | 10 t0 30 |
| Pentene | 0 to 7 |
| Cyclopentene | 0 to 3 |

-continued

| Component | % by weight |
|---|---|
| Cyclopentadiene | 2 to 8 |
| Isoprene | 2 to 10 |
| 2-Methyl-1-butene | 1 to 7 |
| 2-Methyl-2-butene | 1 to 5 |
| 1,3-Pentadiene | 1 to 8 |
| $C_4$ to $C_5$ paraffins (for example, n-butane, isobutane, n-pentane, etc.) | 10 to 25 |
| Others | 0 to 5 |

In the present invention, not only fractions containing the polymerizable monomers selected from the $C_4$–$C_5$ fractions, that is, the $C_4$–$C_5$ fractions, but also a $C_4$ fraction, a $C_4$ fraction from which butadiene has been removed, a $C_5$ fraction, a $C_5$ fraction from which isoprene has been removed, and a $C_5$ fraction from which cyclopentadiene has been removed can be used. The $C_4$ fraction composition generally is as follows:

| Component | % by weight |
|---|---|
| $C_3$-Hydrocarbons | 0 to 3 |
| Butene (isobutene, 1-butene, trans and cis 2-butene) | 40 to 65 |
| Butadiene | 30 to 55 |
| $C_4$-Paraffins (such as n-butane, isobutane) | 1 to 8 |

The $C_4$ fraction after butadiene removal generally has the following composition:

| Component | % by weight |
|---|---|
| $C_3$-Hydrocarbons | 0 to 2 |
| Isobutane and n-Butane | 3 to 15 |
| 1-Butene | 20 to 33 |
| Isobutene (Isobutylene) | 35 to 55 |
| trans- and cis-2-Butene | 10 to 28 |
| 1,3-Butadiene | 0 to 2 |

The $C_5$ fraction generally has the following composition:

| Component | % by weight |
|---|---|
| Pentene (1-pentene, cis and trans-2-pentene) | 3 to 20 |
| 2-Methyl-1-butene | 5 to 15 |
| 2-Methyl-2-butene | 1 to 10 |
| 1,3-Pentadiene (cis and trans) | 4 to 16 |
| Isoprene | 5 to 20 |
| Cyclopentadiene | 2 to 12 |
| 3-Methyl-1-butene | 0 to 2 |
| $C_5$-Paraffins (such as n-pentane, isopentane) | 5 to 30 |
| $C_4$ and $C_6$ Paraffins and Olefins | 0 to 5 |

The composition for the $C_5$ fraction after isoprene removal generally is as follows:

| Component | % by weight |
|---|---|
| Pentene (1-pentene, cis and trans 2-pentene) | 5 to 25 |
| 2-Methyl-1-butene | 3 to 14 |
| 2-Methyl-2-butene | 2 to 11 |
| 1,3-Pentadiene | 7 to 20 |
| Cyclopentadiene | 2 to 10 |
| 3-Methyl-1-butene | 0 to 3 |
| Isoprene | 0 to 5 |
| $C_5$-Paraffins (such as n-pentane, isopentane) | 15 to 45 |
| $C_4$ and $C_6$ Paraffins and Olefins | 3 to 8 |

The general composition of the $C_5$ fraction after cyclopentadiene removal is as follows:

| Component | % by weight |
|---|---|
| Pentene (1-pentene, cis and trans 2-pentene) | 5 to 25 |
| 2-Methyl-1-butene | 4 to 14 |
| 2-Methyl-2-butene | 2 to 10 |
| 1,3-Pentadiene | 8 to 20 |
| 3-Methyl-1-butene | 0 to 3 |
| Isoprene | 8 to 24 |
| Cyclopentadiene | 0 to 3 |
| $C_5$-Paraffins (such as n-pentane, isopentane) | 15 to 45 |
| $C_4$ and $C_6$ Paraffins and Olefins | 0 to 2 |

These above described fractions are copolymerized with 100 parts by weight of isopropenyltoluene in a proportion of 5 to 100, preferably 10 to 50, parts by weight. If the proportion of the fractions is not in the aforesaid range, a resin having satisfactory properties as a tackifier is not obtained.

The catalyst used for the copolymerization is the so-called Friedel-Crafts catalyst, such as aluminum trichloride, aluminum tribromide, dichloromonoethyl aluminum, titanium tetrachloride, tin chloride, boron trifluoride, and various complex compounds of boron trifluoride such as boron trifluoride-phenol complex, boron trifluoride-ethanol complex, boron trifluoride-ether complex and the like, especially, boron trifluoride-phenol complex and boron trifluoride-ethanol complex. The amount of the catalyst is usually about 0.1 to 3.0% by weight, preferably 0.5 to 1.5% by weight, to the amount of the raw materials.

At copolymerization, the saturated hydrocarbons contained in the $C_4$–$C_5$ fractions can be used as a solvent therefor in situ but for removing the heat of reaction and controlling the viscosity of the reaction system, it is preferable to adjust the initial concentration of the polymerizable monomers to about 30 to 50% by weight using a solvent. Examples of appropriate solvents which can be used for this purpose are aliphatic hydrocarbons such as pentane, hexane, heptane, octane, etc.; alicyclic hydrocarbons such as cyclopentane, cyclohexane, methylcyclohexane, etc.; aromatic hydrocarbons such as toluene, xylene, ethylbenzene, mesitylene, etc.; and mixtures of the above-mentioned solvents.

The polymerization temperature depends upon the composition of the raw materials but is generally in the range of from about −50°C to +50°C, preferably −20° to +10°C. The polymerization can be conducted in a batch system or a continuous system. Furthermore, the polymerization can be conducted as a multi-step polymerization as disclosed in U.S. Pat. Nos. 2,755,576, 2,894,937 and 3,379,663, employing the processing parameters hereindisclosed, the polymerization time usually is about 1 to 5 hours, more generally 2 to 4 hours, and the progress and completion of the polymerization can be determined using gas chromatography based on the amount of isopropenyltoluene remaining.

An aqueous alkali or an alcohol such as methanol is generally added to the reaction liquid obtained when the polymerization is completed to decompose and deactivate the catalyst and then the reaction product treated with the alkali or alcohol is washed with water or water containing a small amount of an alcohol. The unreacted materials, solvents, etc., are then stripped by heating or heating under reduced pressure, whereby the desired resin can be obtained. Generally, the unreacted materials, solvent, etc. are stripped by heating and then flashed under reduced pressures, e.g., 5 to 100 mmHg at high temperatures, e.g., 150° to 200°C, in order to complete the stripping.

The resin thus obtained by the process of this invention has the following characteristics:

| (a) | Softening Point (ring and ball method) | : | about 30 to 140°C preferably 70 to 120°C) |
|---|---|---|---|
| (b) | Bromine Value | : | 3 to 20 |
| (c) | Mean Molecular Weight | : | about 500 to 1,200 |
| (d) | Hue | : | Gardner Value 1 to 5 |
| (e) | Other Properties | : | Volatile Components less than 3% (resulting in a lack of an offensive odor) |

The hydrocarbon resin containing an isopropenyltoluene group obtained by the process of this invention can be used as a tackifier and for other various purposes but in particular it is useful as a tackifier for pressure-sensitive adhesives.

The pressure-sensitive adhesives of this invention can be prepared by blending the resin produced by the above-described process with a rubber material such as natural rubber, a styrenebutadiene copolymer rubber, polybutadiene, polyisoprene, polyisobutylene, a butyl rubber, polychloroprene, a butadiene-acrylonitrile copolymer rubber, a polyvinyl ether, and the like, especially natural rubber, a styrene-butadiene copolymer rubber and polyisoprene rubber. The blend ratio of the aforesaid resin is usually about 50 to 150, preferably 30 to 100, parts by weight per 100 parts by weight of the rubber material.

The pressure-sensitive adhesives of this invention can contain, in addition to the aforesaid resin, a plasticizer such as process oil, polybutene, dioctylphthalate (DOP) and dibutyl-phthalate (DBP), a filler such as calcium cabonate ($CaCO_3$), zinc oxide (ZnO) and titanium dioxide ($TiO_2$), a pigment such as zinc oxide (ZnO), an antioxidant (or antiozonate) such as 2,6-di-tert.-butyl-p-cresol, 2,5-di-tert.-butyl-hydroquinone (DBH) and 2,2'-methylene-bis-(4-methyl-6-tert.-butyl phenol) (W-400), a stabilizer, etc.

The blending operation can be conducted in a conventional manner such as using a blending roll or in an appropriate solvent.

More particularly the pressure-sensitive adhesives of the invention can be prepared using the following two approaches.

1. Solvent Type

A rubber is dissolved in a solvent and the resin of this invention along with optional components such as a tackifier resin (hydrocarbon resin), a plasticizer, a filler, an antioxidant, etc. are then added to the above solution followed by mixing at a temperature of room temperature to 50°C for 5 to 25 hours. Suitable examples of solvents which can be used in this process are aromatic hydrocabons such as benzene, toluene, xylene, etc., aliphatic hydrocabons such as pentane, hexane, heptane, etc., halogenated aliphatic hydrocarbons such as trichlene, perclene, etc., and the like.

2. Solvent-free Type

A composition contaning the resin of this invention and a rubber and optionally, a plasticizer, a filler, an antioxidant, etc. is mixed at a temperature of 80° to 150°C for 0.5 to 3 hours using a Bumbury mixer, an open roll, etc.

The pressure-sensitive adhesives of this invention thus prepared are superior in tackiness, adhesive strength, and cohesion and can provide high quality adhesive tapes and labels upon coating on base materials such as papers, cloths, plastic films, etc.

Now, the present invention will be further illustrated in and by the following examples. Unless otherwise indicated, all parts, percents, ratios and the like are by weight.

EXAMPLE 1

In an autoclave were charged 100 g of isopropenyltoluene of a purity of 99.2% obtained by distillation from the acid decomposition products of cymenehydroperoxide in the process of producing cresol by a cymene process as disclosed in U.S. Pat. No. 2,628,983, 10 g of the $C_4$-$C_5$ fraction having a boiling point of −15° to +45°C and containing unsaturated hydrocarbons obtained by the thermal cracking of petroleum naphtha, and 150 g of toluene and then while maintaining the reaction mixture at about 0°C with stirring, 1.5 g of a complex compound of $BF_3$ and phenol was added dropwise to the mixture over a period of about 10 minutes. Thereafter, the reaction system was further stirred for 3 hours. Then, after adding 50 ml of a 5% aqueous solution of sodium hydroxide to the reaction product, the mixture was stirred vigorously for 30 minutes to decompose the catalyst and then an aqueous layer formed was removed. The polymer oil thus obtained was washed with water until the oil became neutral and the unreacted oils and the solvent, toluene were distilled off to provide 105 g of a light yellow resin chucks as a residue.

The compositions of the raw materials used in this example and the properties of the resin thus prepared were as follows:

| Composition of Isopropenyltoluene: | |
|---|---|
| ortho-Isopropenyltoluene | 5.3% |
| meta-Isopropenyltoluene | 60.4% |
| para-Isopropenyltoluene | 33.5% |
| Cymene | 0.8% |
| Composition of the $C_4$-$C_5$ Fraction: | |
| $C_3$-Hydrocarbons | 1.5% |
| Isobutane | 0.4% |
| n-Butane | 1.3% |
| 1-Butene | 10.5% |
| Isobutylene | 19.8% |
| trans-2-Butene | 8.7% |
| cis-2-Butene | 4.4% |
| 1,3-Butadiene | 20.9% |
| n-Pentane | 5.1% |
| Isoprene | 5.6% |
| 1,3-Pentadiene | 2.8% |
| Cyclopentadiene | 3.1% |
| Other Fractions (boiling points lower than 80°C) | 15.9% |

Properties of the Resin:

Hue of 3 (Gardner, ASTM D 154–58), softening point of 92°C (by the ring and ball test), mean molecular weight of 730, and bromine value of 6 (ASTM D 1158–57).

Then, an adhesive was prepared by mixing 24 g of the resin thus obtained, 30 g of natural rubber (RSS No. 1 Mooney viscosity $ML_{1-4}$ (100°C) 76), and 250 g of toluene.

EXAMPLE 2

By following the same polymerization and post treatment as described in Example 1 except that the amount of the C$_4$–C$_5$ fracton employed was 50 g and the reaction temperature was −20°C, 126 g of a resin having the properties of a hue of 3, a softening point of 108°C, a mean molecular weight of 870, and a bromine value of 22 was obtained.

An adhesive was also prepared in the same way as described in Example 1 using the resin thus obtained.

EXAMPLE 3

By following the same polymerization and post treatment as described in Example 1 except that the amount of the C$_4$–C$_5$ fraction was 80 g and the reaction temperature was −35°C, 133 g of a resin having the properties of a hue of 3, a softening point of 81°C, a mean molecular weight of 940, and a bromine value of 27 was obtained.

An adhesive was also prepared in the same way as described in Example 1 using the resin thus obtained.

COMPARISON EXAMPLE 1

By following the same polymerization and post treatment as described in Example 1 except that the amount of the C$_4$–C$_5$ fraction was 120 g and the reaction temperature was −45°C, 141 g of a resin having the properties of hue of 4, a softening point of 83°C, a mean molecular weight of 1130, and a bromine value of 35 was obtained.

COMPARISON EXAMPLE 2

In a flask were charged 100 g of isopropenyltoluene having the same composition as described in Example 1 and 150 g of toluene and while maintaining the reaction system at 5°C under stirring, 1 g of complex compound of BF$_3$ and phenol was added dropwise to the reaction sytem over a period of about 10 minutes. Thereafter, the mixture was further stirred for 3 hours. Then, by conducting the post treatment as described in Example 1, 98 g of a resin having the properties of a hue of 1, a softening point of 97°C, a mean molecular weight of 670, and a bromine value of 1 was obtained.

An adhesive was prepared in the same way as described in Example 1 using the resin thus obtained.

EXAMPLE 4

A mixture of 100 g of isopropenyltoluene having the same composition as described in Example 1 and 60 g of the C$_5$ fraction having a boiling point of 30° to 45°C obtained in the thermal cracking of petroleum naphtha was added dropwise to a flask containing 2 g of anhydrous aluminum chloride and 150 g of toluene at 30°C with stirring over a period of about 10 minutes. Then, after adding 50 ml of methanol and 100 ml of water to the reaction product, the mixture was stirred vigorously for 30 minutes to decompose the catalyst and then an aqueous layer which formed was removed. The polymer oil thus obtained was washed with water until the product became neutral and the unreacted materials and the solvent, toluene were distilled off, whereby 122 g of a resin having the properties of a hue of 6, a softening point of 90°C, a mean molecular weight of 910, and a bromine value of 25 was obtained.

An adhesive was prepared in the same way as described in Example 1 using the resin thus obtained.

The composition of the C$_5$ fraction used in this example was as follows:

| | |
|---|---|
| C$_4$-Hydrocarbons | 0.4% |
| 3-Methyl-1-butene and Isopentane | 12.0% |
| n-Pentane | 17.2% |
| 1-Pentene | 4.8% |
| 2-Methyl-1-butene | 7.2% |
| trans-2-Pentene | 3.1% |
| cis-2-Pentene | 1.8% |
| 2-Methyl-2-butene | 3.5% |
| Isoprene | 14.7% |
| trans-1,3-Pentadiene | 6.7% |
| cis-1,3-Pentadiene | 2.4% |
| Cyclopentadiene | 9.3% |
| Other Fractions (boiling points lower than 80°C) | 17.3% |

EXAMPLE 5

By following the same polymerization and post treatment as described in Example 4 except that a C$_5$ fraction having the same composition as described in Example 4 from which, however, the cyclopentadiene had been removed by heat treatment and distillation thereof (for brevity, such a fraction is designated a "cyclopentadiene-removed C$_5$ fraction") was used in place of the C$_5$ fraction and the reaction temperature was 10°C, 117 g of a resin having the properties of a hue of 4, a softening point of 93°C, a mean molecular weight of 960, and a bromine value of 23 was obtained.

An adhesive was also prepared in the same way as described in Example 1 using the resin thus obtained.

In addition, the composition of the cyclopentadiene-removed C$_5$ fraction used in this example was as follows:

| | |
|---|---|
| C$_4$-Hydrocarbons | 0.3% |
| 3-Methyl-1-butene and Isopentane | 13.5% |
| n-Pentane | 21.4% |
| 1-Pentene | 5.7% |
| 2-Methyl-1-butene | 8.4% |
| trans-2-Pentene | 3.9% |
| cis-2-Pentene | 2.2% |
| 2-Methyl-2-butene | 4.4% |
| Isoprene | 16.3% |
| trans-1,3-Pentadiene | 8.3% |
| cis-1,3-Pentadiene | 2.4% |
| Cyclopentadiene | 0.8% |
| Others | 12.4% |

EXAMPLE 6

By following the same polymerization and post treatment as described in Example 4 except that the C$_5$ fraction from which the isoprene had been removed by extraction (for brevity, such a fraction is designated an "isoprene-removed C$_5$ fraction") was used in place of the C$_5$ fraction and the reaction temperature was −10°C, 114 g of a resin having the properties of a hue of 4, a softening point of 88°C, a mean molecular weight of 990, and a bromine value of 26 was obtained.

An adhesive was also prepared in the same way as described in Example 1 using the resin thus obtained.

In addition, the composition of the isoprene-removed C$_5$ fraction used in this example was as follows:

| | |
|---|---|
| C$_4$-Hydrocarbons | 5.4% |
| 3-Methyl-1-butene and Isopentane | 15.4% |
| n-Pentane | 22.4% |
| 1-Pentene | 4.0% |
| 2-Methyl-1-butene | 7.6% |
| trans-2-Pentene | 2.7% |
| cis-2-Pentene | 1.5% |
| 2-Methyl-2-butene | 2.9% |
| Isoprene | 3.9% |

-continued

| | |
|---|---|
| trans-1,3-Pentadiene | 8.4% |
| cis-1,3-Pentadiene | 3.5% |
| Cyclopentadiene | 2.2% |
| Others | 20.4% |

EXAMPLE 7

In an autoclave were charged 150 g of hexane and 2 g of anhydrous aluminum chloride and while maintaining the mixture at −5°C with stirring, a mixture of 100 g of isopropenyltoluene having the same composition as described in Example 1 and 30 g of a fraction containing unsaturated hydrocarbons having boiling points of −15°C to +20°C and containing mainly 4 carbon atoms (hereinafter, for brevity the fraction is designated a "$C_4$ fraction") obtained by the thermal cracking of petroleum naphtha was added dropwise to the mixture in the autoclave over a period of about 10 minutes. Thereafter, the reaction system was further stirred for 3 hours. Then, after adding to the reaction product, 50 ml of methanol and 100 ml of water, the mixture was stirred vigorously for 30 minutes to decompose the catalyst and an aqueous layer which formed was removed from the system. The polymer oil thus obtained was washed with water until the product became neutral and then the unreacted materials and the solvent, hexane, were distilled off, whereby 118 g of a resin having the properties of a hue of 2, a softening point of 103°C, a mean molecular weight of 810, and a bromine value of 13 was obtained.

An adhesive was also prepared in the same way as described in Example 1 using the resin thus obtained.

In addition, the composition of the $C_4$ fraction used was as follows:

| | |
|---|---|
| $C_3$-Hydrocarbons | 0.2% |
| Isobutane | 0.5% |
| n-Butane | 3.0% |
| 1-Butene | 9.4% |
| Isobutylene | 26.4% |
| trans-2-Butene | 4.6% |
| cis-2-Butene | 3.3% |
| 1,3-Butadiene | 52.3% |
| Others | 0.3% |

EXAMPLE 8

By following the same polymerization and post treatment as described in Example 7 except that the $C_4$ fraction having the same composition as described in Example 7 from which, however, butadiene had been removed by extraction was used in place of the $C_4$ fraction (for brevity, such a fraction is designated a "butadiene-removed $C_4$ fraction") and the reaction temperature was −40°C, 109 g of a resin having the properties of a hue of 2, a softening point of 83°C, a mean molecular weight of 880, and a bromine value of 4 was obtained.

An adhesive was prepared in the same way as described in Example 1 using the resin thus obtained.

In addition, the composition of the butadiene-removed $C_4$ fraction was as follows:

| | |
|---|---|
| $C_3$-Hydrocarbons | 0.3% |
| Isobutane | 2.0% |
| n-Butane | 9.0% |
| 1-Butene | 24.2% |
| Isobutylene | 48.6% |
| trans-2-Butene | 8.2% |
| cis-2-Butene | 5.1% |
| 1,3-Butadiene | 1.0% |

-continued

| | |
|---|---|
| Others | 0.6% |

COMPARISON EXAMPLE 3

In an autoclave were charged 100 g of styrene of 99.9% in purity, 50 g of a $C_4$–$C_5$ fraction having the same composition as described in Example 1, and 150 g of toluene and while maintaining the reaction system at −25°C with stirring, 1.5 g of a complex compound of $BF_3$ and phenol was added dropwise to the mixture over a period of about 10 minutes and thereafter the mixture was further stirred for 3 hours. Then, by subjecting the reaction product to the post treatment as described in Example 1, 120 g of a resin having the properties of a hue of 3, a softening point of 101°C, a mean molecular weight of 1230, and a bromine value of 20 was obtained.

An adhesive was also prepared in the same way as described in Example 1 using the resin thus obtained.

COMPARISON EXAMPLE 4

By following the same polymerization and post treatment as described in Example 3 except that α-methylstyrene of a purity of 99.8% was used in place of styrene and the reaction temperature was −10°C, 124 g of a resin having the properties of a hue of 3, a softening point of 97°C, a mean molecular weight of 860, and a bromine value of 23 was obtained.

An adhesive was also prepared in the same way as described in Example 1 using the resin thus obtained.

COMPARISON EXAMPLE 5

By following the same polymerization and post treatment as described in Comparison Example 3 except that vinyltoluene (having a purity of 99.3% and consisting of 59.3% m-vinyltoluene, 40.1% p-vinyltoluene, and 0.6% o-vinyltoluene) was used in place of styrene and the reaction temperature was −30°C, 122 g of a resin having the properties of a hue of 3, a softening point of 104°C, a mean molecular weight of 1410, and a bromine value of 22 was obtained.

An adhesive was also prepared in the same way as described in Example 1 using the resin thus obtained.

COMPARISON EXAMPLE 6

An adhesive was prepared in the same way as described in Example 1 using Piccolite S-100 (trade name of a terpene resin produced by Pennsylvania Industrial Chemical Corp., U.S.A., having a softening point of 100°C).

Each of the adhesives prepared in the aforesaid examples or comparison examples was coated on a kraft paper using an applicator and after drying for 20 minutes at 100°C, the coated paper was allowed to stand for 8 hours at a constant temperature to provide an adhesive tape. The thickness of the adhesive layer of the adhesive tape was 40 ± 3 microns. The adhesive tape was subjected to the following evaluations described hereinafter.

COMPARISON EXAMPLE 7

In an autoclave, 0.8 g of aluminum chloride was suspended in 20 ml of toluene and 100 g of a $C_4$–$C_5$ fraction as described in Example 1 was added thereto followed by polymerization at a temperature of 50°C for 3 hours. The catalyst was then decomposed by addition of 300 ml of a 5% aqueous sodium hydroxide solution and washed with water to remove unreacted materials and the solvent (toluene). 57 g of a resin was thus obtained as a residue. The resin had a hue of 7 (Gardner), a softening point of 93°C, a mean molecular weight of 1730, and a bromine value of 36.

An adhesive was also prepared in the same way as described in Example 1 using the resin thus obtained.

1. Tackiness (J. Dow Rolling Ball Method):

An adhesive tape having a width of 10 cm and a length of 30 cm was supported on a stand for the tackiness test, which had been set at an angle of 30° to the horizontal, with the opposite surface of the tape to the adhesive layer bearing surface facing the stand. Then a parchment paper was attached to the adhesive paper thus supported at a tape portion 15 cm from the upper end. Various steel balls having diameters ranging from 1/32 inch to 1 inch and differing from each other by 1/32 of an inch rolled from the position were rolled from a position on the parchment paper 10 cm up from the lower end of the parchment paper. The tackiness was expressed by the value obtained by multiplying the maximum diameter of the steel ball stopped on the adhesive layer of the adhesive tape within 10 cm down from the lower end of the parchment paper by 32 (ball No.). Thus, the higher is the value, the larger is the tackiness.

2. Adhesive Strength (180° Stripping Method):

The test was conducted according to the method described in JIS Z 1523.

3. Cohesion (0° Holding Strength Test):

An adhesive tape having a width of 25 mm was attached to a stainless steel plate of an area of 15 mm × 25 mm. The stainless steel plate having the adhesive tape was fixed above, a load of one kg was applied to the lower end of the adhesive tape attached to the plate, and then the distance which the tape had slipped after one hour was measured. Thus, the cohesion is higher with a shorter distance of slipping.

The results obtained are shown in the following table.

Table 1

| Adhesives | Tackiness | Adhesive Strength | Cohesion |
|---|---|---|---|
| | (ball No.) | (g/25 mm width) | (mm) |
| Example 1 | 23 | 1050 | 0.2 |
| Example 2 | 22 | 1090 | 0.2 |
| Example 3 | 20 | 970 | 0.3 |
| Example 4 | 21 | 1040 | 0.2 |
| Example 5 | 20 | 1100 | 0.3 |
| Example 6 | 20 | 1010 | 0.4 |
| Example 7 | 22 | 1130 | 0.2 |
| Example 8 | 24 | 1240 | 0.2 |
| Comparison Example 1 | 11 | 650 | 0.7 |
| Comparison Example 2 | 8 | 510 | 0.2 |
| Comparison Example 3 | 5 | 230 | 0.2 |
| Comparison Example 4 | 6 | 350 | 0.2 |
| Comparison Example 5 | 3 | 110 | 0.3 |
| Comparison Example 6 | 20 | 950 | 1.0 |

Table 1-continued

| Adhesives | Tackiness | Adhesive Strength | Cohesion |
|---|---|---|---|
| Example 7 | 4 | 450 | 0.4 |

From the above results it can be understood that the adhesives of the present invention are excellent in tackiness, adhesive strength, and cohesion as compared with even the adhesive prepared in Comparison Example 6 using the terpene resin.

While the invention has been described in detail and with reference to specific embodiments thereof, it will be apparent to one skilled in the art that various changes and modifications can be made therein without departing from the spirit and scope thereof.

What is claimed is:

1. A pressure-sensitive adhesive composition mainly comprising the hydrocarbon resin (C) produced by the process which comprises copolymerizing 100 parts by weight of vinyl aromatic hydrocarbons (A) comprising about 80 to 100% by weight isopropenyltoluene and 0 to 20% by weight vinyl aromatic hydrocarbons having 8 to 9 carbon atoms and from about 5 to 100 parts by weight of a fraction (B) having a boiling point range from about −15°C to 45°C and comprising a major proportion by weight of unsaturated hydrocarbons having 4 to 5 carbon atoms, which is the by-product in the refining or cracking of petroleum, in the presence of a Friedel-Crafts catalyst and a rubber (D).

2. The pressure-sensitive adhesive composition as claimed in claim 1, wherein the proportion of said hydrocarbon resin (C) ranges from about 50 to 150 parts by weight per 100 parts by weight of said rubber (D).

3. The pressure-sensitive adhesive composition as claimed in claim 1, wherein said rubber (D) is selected from the group consisting of natural rubber, a styrene-butadiene copolymer rubber, polybutadiene, polyisoprene, polyisobutylene, a butyl rubber, polychloroprene, a butadiene-acrylonitrile copolymer rubber and a polyvinyl ether.

4. A pressure-sensitive adhesive composition mainly comprising the hydrocarbon resin (C) produced by the process which comprises copolymerizing 100 parts by weight of isopropenyltoluene (A) and 10 to 50 parts by weight of a by-product fraction (B) produced in cracking or refining petroleum and having a boiling point ranging from about −15°C to 45°C, and comprising a major proportion by weight of unsaturated hydrocarbons having 4 to 5 carbon atoms, at temperatures of −20° to 10°C in the presence of a complex compound of boron trifluoride and phenol in an amount of about 0.1 to 1.5% by weight of the total amount of said components (A) and (B) and toluene and a rubber (D).

5. The pressure-sensitive adhesive composition as claimed in claim 4, wherein the proportion of said hydrocarbon resin (C) is 30 to 100 parts by weight per 100 parts by weight of said rubber (D).

6. The pressure-sensitive adhesive composition as claimed in claim 4, wherein said rubber (D) is selected from the group consisting of natural rubber, a styrene-butadiene copolymer rubber, polybutadiene, polyisoprene, polyisobutylene, a butyl rubber, polychloroprene, a butadiene-acrylonitrile copolymer rubber and a polyvinyl ether.

* * * * *